(12) United States Patent
Iida et al.

(10) Patent No.: US 8,081,027 B2
(45) Date of Patent: Dec. 20, 2011

(54) RECEPTION DEVICE, CONTROL METHOD, AND PROGRAM

(75) Inventors: Yasuhiro Iida, Tokyo (JP); Kazuhisa Funamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 472 days.

(21) Appl. No.: 11/946,351

(22) Filed: Nov. 28, 2007

(65) Prior Publication Data

US 2008/0136510 A1   Jun. 12, 2008

(30) Foreign Application Priority Data

Dec. 8, 2006 (JP) ................................ P2006-331473

(51) Int. Cl.
*H04L 27/22* (2006.01)
(52) U.S. Cl. ........ 329/307; 329/304; 329/325; 329/360; 375/316; 375/327
(58) Field of Classification Search .................. 329/304, 329/307, 325, 360; 375/316, 327
See application file for complete search history.

(56) References Cited

U.S. PATENT DOCUMENTS

| | | | | |
|---|---|---|---|---|
| 6,678,336 B1 * | 1/2004 | Katoh et al. | ................... | 375/316 |
| 6,683,921 B1 * | 1/2004 | Shiraishi et al. | ............... | 375/331 |
| 6,813,321 B1 * | 11/2004 | Katoh et al. | ................... | 375/329 |
| 6,940,923 B2 * | 9/2005 | Ohishi | ........................... | 375/326 |
| 6,947,512 B1 * | 9/2005 | Shinoda et al. | ................ | 375/371 |
| 6,993,096 B1 * | 1/2006 | Shiraishi et al. | ............... | 375/329 |
| 7,079,597 B1 * | 7/2006 | Shiraishi et al. | ............... | 375/326 |
| 7,529,321 B1 * | 5/2009 | Shiraishi et al. | ............... | 375/329 |
| 2002/0106036 A1 * | 8/2002 | Shiraishi et al. | ............... | 375/329 |

FOREIGN PATENT DOCUMENTS

| | | |
|---|---|---|
| EP | 1054537 | 11/2000 |
| JP | 2000-324192 | 11/2000 |
| JP | 3205313 | 6/2001 |
| JP | 2001-345869 | 12/2001 |
| JP | 2002-94585 | 3/2002 |
| JP | 3646010 | 2/2005 |

OTHER PUBLICATIONS

Extended European search report in English, dated Feb. 19, 2010, issued in counterpart Application No. EP 07122127 (7 pages).
Eiji Arita et al, "A Dynamically Configurable Multiformat PSK Demodulator for Digital HDTV using Broadcasting-Satellite," Feb. 7, 2000, pp. 72-73.

* cited by examiner

*Primary Examiner* — Arnold Kinkead
*Assistant Examiner* — Richard Tan
(74) *Attorney, Agent, or Firm* — Finnegan, Henderson, Farabow, Garrett & Dunner, LLP

(57) ABSTRACT

A reception device that receives a modulation signal being a result of digital modulation of a carrier is disclosed. The device includes:
a demodulation section that demodulates the modulation signal into a demodulation signal including an I component and a Q component;
a numerically controlled oscillation section that generates a signal of predetermined phase;
a phase error detection section that detects a phase error between a phase of a symbol of the demodulation signal and the predetermined phase of the signal generated by the numerically controlled oscillation section;
a phase rotation section that rotates the phase of the symbol of the demodulation signal in accordance with the phase error;
a loop filter that filters the phase error, and controls the numerically controlled oscillation section; and
a gain control section that controls a gain of the loop filter based on a modulation technique of the modulation signal.

6 Claims, 7 Drawing Sheets

RECEPTION DEVICE, CONTROL METHOD, AND PROGRAM

CROSS REFERENCES TO RELATED APPLICATIONS

The present invention contains subject matter related to Japanese Patent Application JP 2006-331473 filed in the Japanese Patent Office on Dec. 8, 2006, the entire contents of which being incorporated herein by reference.

BACKGROUND OF THE INVENTION

1. Field of the Invention

The present invention relates to a reception device, a control method, and a program and, more specifically, to a reception device that receives a modulation signal being the result of digital modulation of a carrier with various modulation techniques, and a control method and a program that can enhance the capabilities of the reception device.

2. Description of the Related Art

With BS (Broadcasting Satellite) digital broadcasting, a modulation technique of subjecting a carrier to digital modulation includes BPSK (Binary PSK (Phase Shift Keying), QPSK (Quadrature PSK), and 8PSK, which are available for a dynamic selection.

It means that, with BS digital broadcasting, transmitted is a modulation signal being the result of modulating a carrier by any of BPSK, QPSK, and 8PSK. The modulation is performed based on any target data for transmission.

With BS digital broadcasting, data transmission is made on a super frame basis.

FIG. 1 shows the format of a modulation signal of a super frame to be received by a reception device, which receives BS digital broadcast services.

The super frame is configured by eight frames of #1, #2, #3, #4, #5, #6, #7, and #8.

The frame #i (i=1, 2, . . . , and 8) is configured by symbol sets being sequentially in order from its head. The symbol sets include a set of 32 symbols of unique data W1, a set of 128 symbols of TMCC (Transmission Multiplexing Configuration Control), a set of 32 symbols of unique data W2 or W3, and 4×48 sets of 203 symbols of a main signal and 4 symbols of a burst signal. As such, the frame #i is configured by 39936 (=32+128+32+(203+4)×4×48) symbols.

The symbols of the data W1, W2, and W3 are each unique and known, and subjected to BPSK modulation. The symbols are used for establishing frame synchronization in the reception device.

Note that, in the frame #i, the symbols of the data W1 and the symbols of the data W2 or W3 are so disposed as to sandwich the symbols of TMCC therebetween. Specifically, among the eight frames of #1 to #8 configuring the super frame, the frame #1 includes the symbols of the data W1 and the symbols of the data W2, and the remaining frames of #2 to #8 each include the symbols of the data W1 and the symbols of the data W3.

In the below, as appropriate, the symbols of the data W1, W2, and W3 are respectively referred to as unique symbols W1, W2, and W3, and either the unique symbols W2 or those of W3 are referred to as unique symbols W2/W3 as appropriate.

The TMCC is control information including a modulation technique, a coding technique, and others for the main signal in the modulation signal. The symbols of the TMCC are subjected to BPSK modulation.

With modulation including digital modulation, a carrier is modulated in accordance with any target data for transmission so that a modulation signal is derived. In this specification, for convenience of description, modulating a carrier in accordance with any target data for transmission is referred also to as modulating any target data for transmission.

The symbols of the TMCC can be decoded on a frame basis, and in the reception device, the resulting TMCC after decoding of the symbols thereof is used to find the modulation technique for the main signal in the modulation signal so that the main signal can be demodulated.

Note that, in the reception device, the TMCC of a super frame is subjected to Reed-Solomon decoding so that the modulation technique can be found for the main signal in the resulting modulation signal.

The main signal is original information exemplified by coding data or others that are supposed to be transmitted. The coding data here is the result of applying MPEG coding to image data. The symbols of the main signal are modulated by any of the modulation techniques of BPSK, QPSK, and 8PSK.

Note that the modulation technique for the symbols of the main signal can be defined on a symbol type basis, i.e., the symbols of the burst signal, or the 203 symbols of the main signal sandwiched between the unique symbols W2/W3 and the symbols of the burst signal.

The burst signal is a PRBS (Pseudo Random Bit Sequence) (Pseudo Random Binary Sequence) signal of a frame period, and the symbols of the burst signal are those known to be subjected to BPSK modulation.

Herein, the symbols of the burst signal are referred to as burst symbols as appropriate.

The burst symbols are provided intermittently in the modulation signal to enable establishment of carrier synchronization in the reception device even if with a low C/N (Carrier to Noise Ratio).

That is, in the reception device, through multiplication of a carrier, a modulation signal is demodulated to a demodulation signal including an I component of the same phase as that of the carrier and a Q component orthogonal to the carrier. The issue here is that there is generally an error between a carrier for use by the reception device and a carrier for use by a transmission device from which the modulation signal comes. As a result of such an error, the symbols of the demodulation signal derived in the reception device rotate on an IQ plane, which is defined by an I axis indicating the I component and a Q axis indicating the Q component.

In the reception device, for the aim of compensating such rotation of the symbols of the demodulation signal, the carrier synchronization is established.

Specifically, in the reception device, a phase error is detected, and the phase error is filtered by a loop filter, for example. The phase error is of between a signal of predetermined phase coming from an NCO (Numerically Controlled Oscillator) and symbols of the demodulation signal. The filtering result by the loop filter is then used as a basis to control the NCO, and based on the phase error, phase rotation is performed with respect to the symbols of the demodulation signal in such a manner as to correct the phase error.

As such, for establishing carrier synchronization, when symbols are being subjected to QPSK or 8PSK modulation with which a distance between signal points is relatively small on the IQ plane, if a C/N is low, it may cause a difficulty in establishing carrier synchronization.

In consideration thereof, as shown in FIG. 1, the modulation signal includes intermittently the burst symbols that are known and have been subjected to BPSK modulation with which a distance between signal points is large. With such burst symbols, even if a C/N is low, carrier synchronization can be established in the reception device.

Patent Document 1 (Japanese Patent No. 3205313) describes a technology of changing the gain of a loop filter for use to establish carrier synchronization in accordance with a ratio of average error between a phase direction of a demodulation signal and an amplitude direction thereof.

Patent Document 2 (Japanese Patent No. 3646010) describes about the setting of, based on the phase noise characteristics of an antenna, a filter coefficient of a loop filter for use to establish carrier synchronization.

SUMMARY OF THE INVENTION

As described above, the symbols of a main signal in a modulation signal are modulated by any of the modulation techniques of BPSK, QPSK, and 8PSK. In the previous technologies, the gain of a loop filter for use to establish carrier synchronization is set irrespective of which modulation technique. This thus often causes the reduction of the capabilities of a reception device with some C/N of a modulation signal and the phase noise characteristics, e.g., failing to establish carrier synchronization, causing malfunction of a circuit for establishing carrier synchronization, causing cycle slips, and others.

It is thus desirable to enhance the capabilities of a reception device that receives a modulation signal as a result of digital modulation of a carrier by modulation techniques varying in type.

According to an embodiment of the present invention, there is provided a reception device that receives a modulation signal being a result of digital modulation of a carrier. The device includes: a demodulation section that demodulates the modulation signal into a demodulation signal including an I component of the same phase as that of the carrier and a Q component orthogonal to the carrier; a numerically controlled oscillation section that generates a signal of predetermined phase; a phase error detection section that detects a phase error between a phase of a symbol of the demodulation signal and the predetermined phase of the signal generated by the numerically controlled oscillation section; a phase rotation section that rotates the phase of the symbol of the demodulation signal in accordance with the phase error; a loop filter that filters the phase error, and in accordance with a filtering result, controls the numerically controlled oscillation section; and a gain control section that controls a gain of the loop filter based on a modulation technique of the modulation signal.

According to another embodiment of the present invention, there is provided a control method or a program of controlling a reception device that receives a modulation signal being a result of digital modulation of a carrier. The reception device includes: a demodulation section that demodulates the modulation signal into a demodulation signal including an I component of the same phase as that of the carrier and a Q component orthogonal to the carrier; a numerically controlled oscillation section that generates a signal of predetermined phase; a phase error detection section that detects a phase error between a phase of a symbol of the demodulation signal and the predetermined phase of the signal generated by the numerically controlled oscillation section; a phase rotation section that rotates the phase of the symbol of the demodulation signal in accordance with the phase error; and a loop filter that filters the phase error, and in accordance with a filtering result, controls the numerically controlled oscillation section. The control method or the program includes a step of controlling a gain of the loop filter based on a modulation technique of the modulation signal.

According to an embodiment of the invention, the gain of the loop filter is controlled based on a modulation technique of the modulation signal.

Note that the program can be distributed through transmission via a transmission medium or through recording to a recording medium.

According to an embodiment of the invention, capability enhancement is possible in the reception device.

DESCRIPTION OF THE PREFERRED EMBODIMENT

Figure 1:
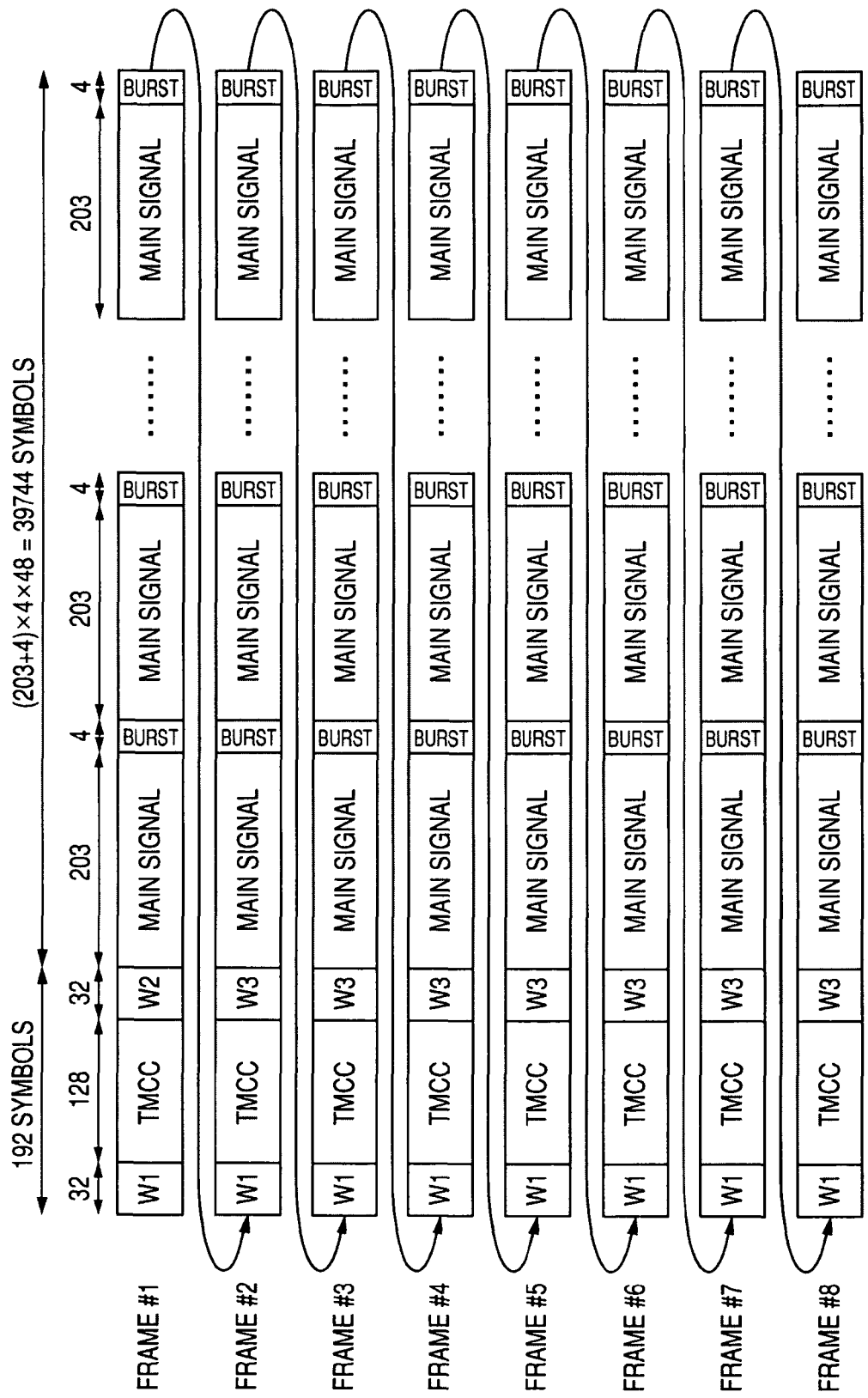
FIG. 1 is a diagram showing the format of a super frame.

Prior to describing an embodiment of the invention below, exemplified is a correlation among claimed components and embodiments in this specification or in the accompanying drawings. This is aimed to prove that an embodiment provided for the purpose of supporting the description of claims is described in the specification or in the accompanying drawings. Therefore, even if there is any specific embodiment found in the specification or in the accompanying drawings but not found here for the components described in the an embodiment of the invention, it does not mean that the embodiment is not correlated with the components. On the other hand, even if there is any specific embodiment found here for the components, it does not mean that the embodiment is only correlated with the components.

One embodiment of the invention is directed to a reception device (e.g., reception device of FIG. 2) that receives a modulation signal being a result of digital modulation of a carrier. The reception device includes: a demodulation section (e.g., demodulation section 11 of FIG. 2) that demodulates the modulation signal into a demodulation signal including an I component of the same phase as that of the carrier and a Q component orthogonal to the carrier; a numerically controlled oscillation section (e.g., NCO 37 of FIG. 3) that generates a signal of predetermined phase; a phase error detection section (phase error detection section 32 of FIG. 3) that detects a phase error between a phase of a symbol of the demodulation signal and the predetermined phase of the signal generated by the numerically controlled oscillation section; a phase rotation section (e.g., phase rotation section 33 of FIG. 3) that rotates the phase of the symbol of the demodulation signal in accordance with the phase error; a loop filter (e.g., loop filter 36 of FIG. 3) that filters the phase error, and in accordance with a filtering result, controls the numerically controlled oscillation section; and a gain control section (e.g., gain control section 38 of FIG. 3) that controls a gain of the loop filter based on a modulation technique of the modulation signal.

The reception device of the embodiment further includes a control information detection section (e.g., TMCC detection section 17 of FIG. 2) that detects, from the demodulation section, control information including a modulation technique of the modulation signal. In the device, the gain control section controls the gain of the loop filter based on the modulation technique found in the control information.

The reception device of the embodiment further includes a gain storage section (e.g., gain storage section 72 of FIG. 3) that stores therein a gain for each of a plurality of modulation techniques. In the device, the gain control section controls the gain of the loop filter to suit the modulation technique found in the control information.

The reception device of the embodiment further includes a C/N (Carrier to Noise Ratio) detection section (e.g., C/N detection section 81 of FIG. 6) that detects a C/N of the modulation signal. In the device, the gain control section adjusts the gains stored in the gain storage section based on the C/N.

The reception section of the embodiment further includes a phase noise characteristics detection section (e.g., phase noise characteristics detection section 91 of FIG. 7) that detects phase noise characteristics of the modulation signal. In the device, the gain control section adjusts the gains stored in the gain storage section also based on the phase noise characteristics.

Another embodiment of the invention is directed to a control method or a program, for execution by a computer, of controlling a reception device (e.g., reception device of FIG. 2) that receives a modulation signal being a result of digital modulation of a carrier. The reception device includes: a demodulation section (e.g., demodulation section 11 of FIG. 2) that demodulates the modulation signal into a demodulation signal including an I component of the same phase as that of the carrier and a Q component orthogonal to the carrier; a numerically controlled oscillation section (e.g., NCO 37 of FIG. 3) that generates a signal of predetermined phase; a phase error detection section (e.g., phase error detection section 32 of FIG. 3) that detects a phase error between a phase of a symbol of the demodulation signal and the predetermined phase of the signal generated by the numerically controlled oscillation section; a phase rotation section (e.g., phase rotation section 33 of FIG. 3) that rotates the phase of the symbol of the demodulation signal in accordance with the phase error; and a loop filter (e.g., loop filter 36 of FIG. 3) that filters the phase error, and in accordance with a filtering result, controls the numerically controlled oscillation section. The control method or the program includes a step (e.g., step S11 of FIG. 4) of controlling a gain of the loop filter based on a modulation technique of the modulation signal.

In the below, an embodiment of the invention is described by referring to the accompanying drawings.

Figure 2:
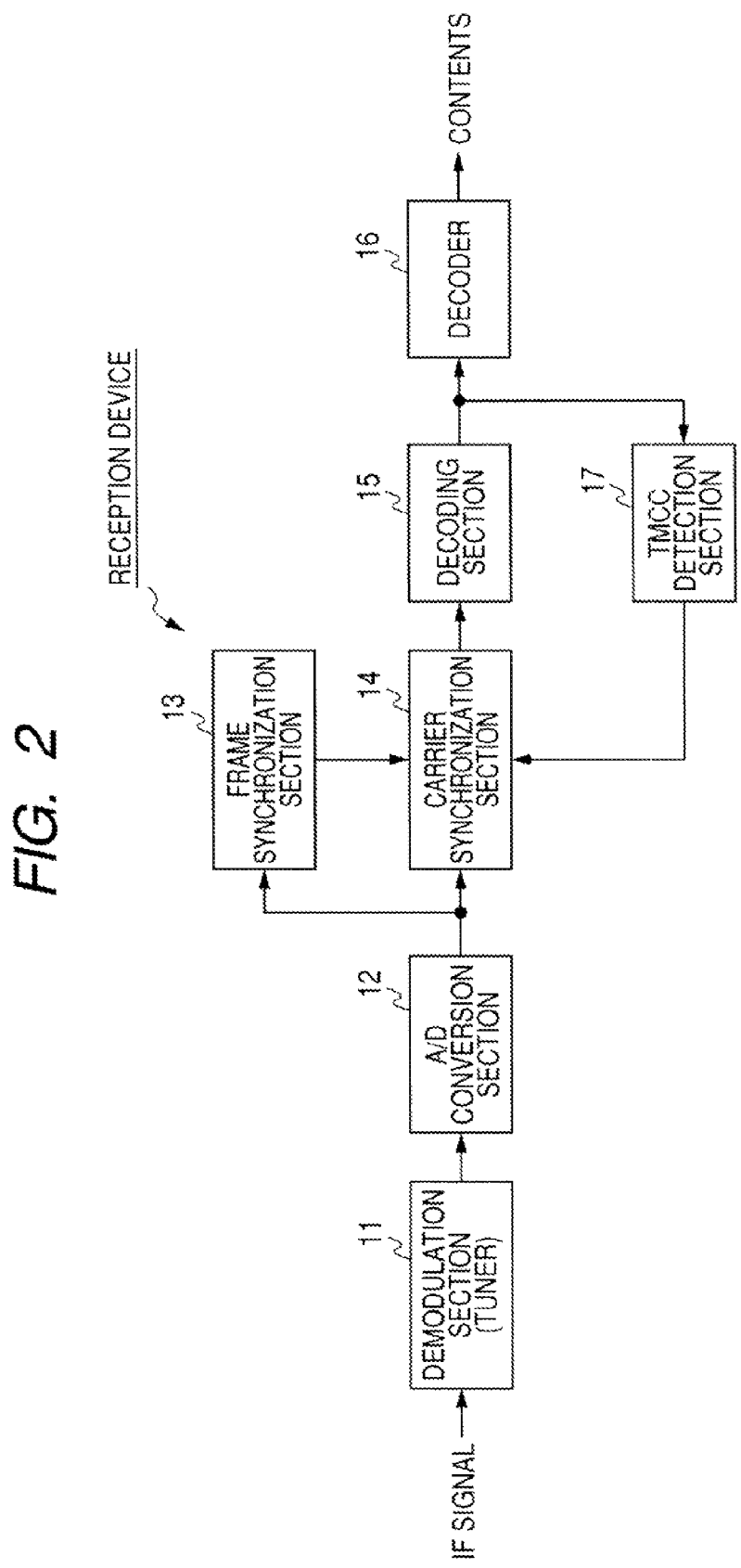
FIG. 2 is a block diagram showing an exemplary configuration of a reception device in an embodiment to which the invention is applied.

FIG. 2 is a diagram showing an exemplary configuration of a reception device of the embodiment to which the invention is applied.

In FIG. 2, the reception device is configured to include a demodulation section 11, an A/D (Analog/Digital) conversion section 12, a frame synchronization section 13, a carrier synchronization section 14, a decoding section 15, a decoder 16, a TMCC detection section 17, and others.

The demodulation section 11 is provided with an IF (Intermediate Frequency) signal of the modulation signal of FIG. 1, i.e., the modulation signal turned out to be an IF signal as a result of a broadcast wave of a BS digital broadcasting program being received by an antenna that is not shown, that is, as a result of a carrier being subjected to digital modulation in a broadcast station providing BS digital broadcasting services.

The demodulation section 11 is a tuner, and performs carrier multiplication to an incoming IF signal of a modulation signal, thereby demodulating the IF signal of the modulation signal. The resulting demodulation signal includes an I component of the same phase as that of the carrier and a Q component orthogonal to the carrier, and is forwarded to the A/D conversion section 12.

The A/D conversion section 12 applies A/D conversion to the analog demodulation signal provided by the demodulation section 11. The resulting digital demodulation signal is forwarded to the frame synchronization section 13 and the carrier synchronization section 14.

Based on the demodulation signal coming from the A/D conversion section 12, the frame synchronization section 13 establishes so-called timing synchronization. The frame synchronization section 13 also detects, from the demodulation signal, unique symbols W1, and W2/W3 being known symbols so that so-called frame synchronization is established. The frame synchronization section 13 forwards known symbol information to the carrier synchronization section 14. The known symbol information includes the timings of the unique symbols W1, W2, and W3 and the timings of the burst symbols all being known symbols in the demodulation signal.

The carrier synchronization section 14 establishes the carrier synchronization for the demodulation signal provided by the A/D conversion section 12 using, as appropriate, the known symbol information provided by the frame synchronization section 13, and the TMCC provided by the TMCC detection section 17. As such, as described in the foregoing, the resulting demodulation signal is corrected with the symbol rotation, and is forwarded to the decoding section 15.

The decoding section 15 applies a decoding process to the demodulation signal coming from the carrier synchronization section 14, and forwards the resulting decoding data to the decoder 16 and the TMCC detection section 17. The decoding process here includes Viterbi decoding, Reed-Solomon decoding, and others.

The decoder 16 applies MPEG decoding to the coding data, as a main signal, in the decoding data coming from the decoding section 15, e.g., coding data as a result of MPEG coding. The resulting content data, e.g., image data and audio data, is then output.

The TMCC detection section 17 detects TMCC from the decoding data coming from the decoding section 15, and forwards the detection result to the carrier synchronization section 14. The TMCC here is control information including a modulation technique of the main signal.

Figure 3:
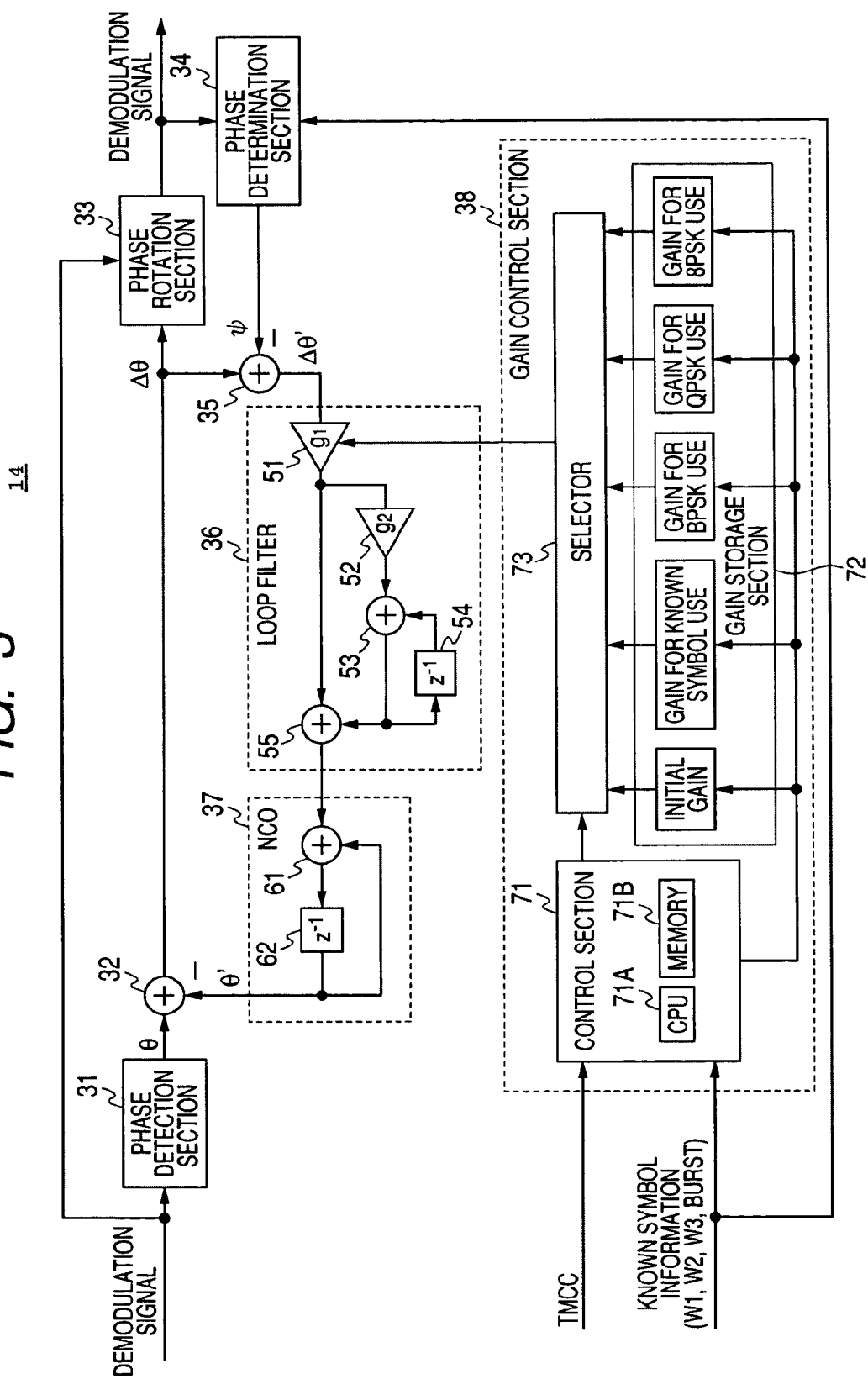
FIG. 3 is a block diagram showing an exemplary configuration of a carrier synchronization section 14.

FIG. 3 shows an exemplary configuration of the carrier synchronization section 14 of FIG. 2.

The carrier synchronization section 14 is configured to include a phase detection section 31, a phase error detection section 32, a phase rotation section 33, a phase determination section 34, a computation section 35, a loop filter 36, an NCO 37, a gain control section 38, and others.

The phase detection section 31 is provided with the demodulation signal coming from the A/D conversion section 12 (FIG. 2).

The phase detection section 31 detects a phase $\theta$ of symbols of the demodulation signal coming from the A/D conversion section 12, and forwards the result to the phase error detection section 32.

The phase error detection section 32 detects a phase error $\Delta\theta$ of the phase $\theta$ of the symbols by subtracting a phase $\theta'$ of a signal provided by the NCO 37 from the phase $\theta$ of the symbols provided by the phase detection section 31. The detection result is forwarded to the phase rotation section 33 and the computation section 35.

As described above, the phase rotation section 33 is provided with the phase error $\Delta\theta$ from the phase error detection section 32, and is also provided with the demodulation signal from the A/D conversion section 12 (FIG. 2).

The phase rotation section 33 performs phase rotation to the symbols of the demodulation signal from the A/D conversion section 12 so as to correct the phase error $\Delta\theta$ from the phase error detection section 32. The symbols after such phase rotation are then forwarded to the phase determination section 34 and the decoding section 15 (FIG. 2).

As described above, the phase determination section 34 is provided with the symbols corrected with the phase error $\Delta\theta$ from the phase rotation section 33, and the known symbol information from the frame synchronization section 13 (FIG. 2).

When the known symbol information is provided by the frame synchronization section 13, the phase determination section 34 forwards, to the computation section 35, the phase $\Psi$ of the unique symbols W1, W2, and W3 or that of the burst symbols, whose timings are found in the known symbol information.

Herein, the unique symbols W1, W2, and W3 and the burst symbols are all known and have been subjected to BPSK modulation, and their phases $\Psi$ is either 0 or $\Pi$ (radian).

When the known symbol information is not provided by the frame synchronization section 13, i.e., when it is at a timing when symbols not including the unique symbols W1, W2, and W3 and the burst symbols are provided to the phase detection section 31 and the phase rotation section 33, the phase determination section 34 applies a hard decision to the symbols coming from the phase rotation section 33. The result of the hard decision, i.e., phase $\Psi$ of a signal point on the IQ plane, is then forwarded to the computation section 35.

The computation section 35 subtracts, from the phase error $\Delta\theta$ provided by the phase error detection section 32, the phase $\Psi$ coming from the phase determination section 34, thereby converting the phase error $\Delta\theta$ into the phase error $\Delta\theta'$ relative to the phase $\Psi$ for supply to the loop filter 36.

The loop filter 36 is configured to include amplifiers 51 and 52, a computation unit 53, a delay circuit 54, and a computation unit 55. The loop filter 36 filters the phase error $\Delta\theta'$ coming from the computation section 35, and in accordance with the filtering result, controls the NCO 37.

That is, in the loop filter 36, the phase error $\Delta\theta'$ from the computation section 35 is forwarded to the amplifier 51.

The amplifier 51 amplifies the phase error $\Delta\theta'$ from the computation section 35 by $g_1$ (gain) times, and forwards the result to the amplifier 52 and the computation unit 55.

The amplifier 52 amplifies the output of the amplifier 51 by $g_2$ (gain) times, and forwards the result to the computation unit 53.

The computation unit 53 adds together the output of the amplifier 52 and the output of the delay circuit 54, and forwards the result to the delay circuit 54 and the computation unit 55.

The delay circuit 54 delays the output of the computation unit 53 by the time of a symbol, and forwards the result to the computation unit 53.

The computation unit 55 adds together the output of the amplifier 51 and the output of the computation unit 53, and to the NCO 37, forwards the value being the addition result as the filtering result of the phase error $\Delta\theta'$.

The NCO 37 is configured to include a computation unit 61 and a delay circuit 62, and generates a signal of predetermined phase $\theta'$ in accordance with the output of the loop filter 36. The resulting signal is forwarded to the phase error detection section 32 as a signal corresponding to the original signal point of the symbols on the IQ plane, i.e., the coordinates on the IQ plane. The symbols here are those having been subjected to detection of the phase $\theta$ in the phase detection section 31.

That is, in the NCO 37, the computation unit 61 adds together the output of the computation unit 55 of the loop filter 36 and the output of the delay circuit 62, and forwards the result to the delay circuit 62.

The delay circuit 62 delays the output of the computation unit 61 by the time of a symbol, and forwards the result to the computation unit 61. The delay circuit 62 also forwards, to the phase error detection section 32, the output of the computation unit 61 as a signal of predetermined phase $\theta'$.

The gain control section 38 is configured to include a control section 71, a gain storage section 72, and a selector 73. The gain control section 38 controls the loop gain of the loop filter 36 based on the modulation technique of the modulation signal.

That is, the control section 71 is configured to include a CPU (Central Processing Unit) 71A, a memory 71B, and others. The control section 71 goes through various types of processing by the CPU 71A running a program stored in the memory 71B, e.g., changing the storage details of the gain storage section 72, and controlling the selector 73.

To be specific, in response to a user's operation of an operation section that is not shown, the control section 71 changes the gains stored in the gain storage section 72, i.e., initial gain, known symbol gain, gain for BPSK use, gain for QPSk use, and gain for 8PSK use.

The control section 71 is so configured as to receive the known symbol information from the frame synchronization section 13 (FIG. 2), and the TMCC from the TMCC detection section 17 (FIG. 2). The control section 71 controls the selector 73 in accordance with the known symbol information and the TMCC, thereby making the selector 73 to select any of the gains stored in the gain storage section 72, i.e., initial gain, known symbol gain, gain for BPSK use, gain for QPSk use, and gain for 8PSK use.

The gain storage section 72 stores therein, for use as a gain $g_1$ of the amplifier 51 of the loop filter 36, a gain for each of a plurality of modulation techniques to be used for modulating the symbols of a main signal.

That is, the gain storage section 72 stores therein, as a gain for each of a plurality of modulation techniques to be used for modulating the symbols of a main signal, a BPSK gain being a gain for BPSK, a QPSK gain being a gain for QPSK, and an 8PSK gain being a gain for 8PSK.

The gain storage section 72 stores therein also an initial gain and a known symbol gain.

The initial gain is used as the gain $g_1$ of the amplifier 51 in the state that no frame synchronization is being established.

The known symbol gain is used, after frame synchronization is established, as the gain $g_1$ of the amplifier 51 when the carrier synchronization section 14 processes the unique symbols W1, W2, and W3, and the burst symbols, all of which are known symbols.

After frame synchronization is established, and after the TMCC is detected, the BPSK gain, the QPSK gain, and the 8PSK gain are respectively used as the gain $g_1$ of the amplifier 51 while the symbols of the main signal are being subjected to BPSK modulation, QPSK modulation, or 8PSK modulation.

The gain storage section 72 is stored with initial values of the gains, i.e., initial gain, known symbol gain, BPSK gain, QPSK gain, and 8PSK gain, in facilities of manufacturing reception devices or others.

For an initial value of the initial gain, a simulation or others are performed to derive a value that does not cause the carrier synchronization section 14 to operate unstably in the state that no frame synchronization is established. For an initial value of the known symbol gain, when the unique symbols W1, W2, and W3 and the burst symbols all being known symbols are processed in the carrier frequency section 14, for example, a simulation or others are performed to derive a value considered appropriate for the symbol processing.

Moreover, for an initial value of the BPSK gain, a simulation or others are performed to derive a value considered appropriate for the symbol processing when any of the symbols through with BPSK modulation in the main signal are processed in the carrier synchronization section 14, for example.

Also for an initial value of the QPSK gain and that of the 8PSK, when any of the symbols through with QPSK or 8PSK modulation in the main signal are processed in the carrier synchronization section 14, for example, a simulation or others are performed to derive a value considered appropriate for the symbol processing.

Note that, considered now is an initial value of the BPSK gain for use with symbols through with BPSK modulation, with which a distance between signal points on the IQ plane is relatively large. Such an initial value of the BPSK gain is set to be larger than an initial value of the QPSK gain and that of the 8PSK gain so that the phase θ' of the signal generated by the NCO 37 responds sensitively to the phase error Δθ.

Also considered now is an initial value of the 8PSK gain for use with symbols through with 8PSK modulation, with which a distance between signal points on the IQ plane is relatively small. Such an initial value of the 8PSK gain is set to be smaller than an initial value of the BPSK gain and that of the QPSK gain so that the phase θ' of the signal generated by the NCO 37 does not respond sensitively to the phase error Δθ.

By being under the control of the control section 71, the selector 73 selects any of the gains stored in the gain storage section 72, i.e., initial gain, known symbol gain, BPSK gain, QPSk gain, and 8PSK gain. Thus selected gain is then forwarded to the amplifier 51 of the loop filter 36 for use as the gain $g_1$ of the amplifier 51.

With the carrier synchronization section 14 configured as such, a process of establishing carrier synchronization for a demodulation signal provided by the A/D conversion section 12 (FIG. 2) is executed using, as appropriate, the known symbol information provided by the frame synchronization section 13 and the TMCC provided by the TMCC detection section 17 starting a TMCC detection process, which will be described later.

That is, in the carrier synchronization section 14, the phase detection section 31 and the phase rotation section 33 are provided with a demodulation signal from the A/D conversion section 12 (FIG. 2).

After frame synchronization is established in the frame synchronization section 13 (FIG. 2), the control section 71 of the gain control section 38 is provided with the known symbol information. Moreover, after the TMCC is detected in the TMCC detection section 17, the control section 71 is provided with the TMCC.

In the gain control section 38, the control section 71 controls the selector 73 in accordance with incoming known symbol information, TMCC, and others, thereby making the selector 73 to select any of the gains stored in the gain storage section 72, i.e., initial gain, known symbol gain, BPSK gain, QPSK gain, and 8PSK gain, for use as the gain $g_1$ of the amplifier 51 of the loop filter 36, i.e., gain control process.

The phase detection section 31 detects the phase θ of the symbols of the demodulation signal provided by the A/D conversion section 12 (FIG. 2), and forwards the detection result to the phase error detection section 32.

The phase error detection section 32 detects a phase error Δθ between the phase θ of the symbols provided by the phase defection section 31 and the phase θ' of the signal from the NCO 37. The detected phase error Δθ is forwarded to the phase rotation section 33 and the computation unit 35.

On the other hand, when the known symbol information is provided from the frame synchronization section 13, the phase determination section 34 forwards, to the computation section 35, the phase Ψ of the symbols whose timings are found in the known symbol information, i.e., the unique symbols W1, W2, and W3 or the burst symbols.

When the known symbol information is not provided by the frame synchronization section 13, the phase determination section 34 applies a hard decision to the symbols coming from the phase rotation section 33. The result of the hard decision, i.e., the phase Ψ of the signal point on the IQ plane, is forwarded to the computation section 35.

The computation section 35 subtracts the phase Ψ provided by the phase determination section 34 from the phase error Δθ provided by the phase error detection section 32 so that the phase error Δθ is converted into the phase error Δθ' relative to the phase Ψ. The conversion result is then forwarded to the loop filter 36.

The loop filter 36 filters the phase error Δθ' coming from the computation section 35, and controls the NCO 37 in accordance with the filtering result. The NCO 37 generates a signal of predetermined phase θ' in accordance with the control of the loop filter 36, and forwards the resulting signal to the phase error detection section 32.

In the phase error detection section 32, as described above, detected is the phase error Δθ between the phase θ of the symbols from the phase detection section 31 and the phase θ' of the signal from the NCO 37. Thus detected phase error Δθ is forwarded to the phase rotation section 33 and the computation section 35.

In the phase rotation section 33, the phase of the symbols of the demodulation signal from the A/D conversion section 12 is so rotated as to correct the phase error Δθ provided by the phase error detection section 32. The symbols after such phase rotation are then forwarded to the phase determination section 34 and the decoding section 15 (FIG. 2).

Herein, in the carrier synchronization section 14 of FIG. 3, the components, i.e., the phase detection section 31, the phase error detection section 32, the computation section 35, the loop filter 36, and the NCO 37, are configuring a so-called PLL (Phase Lock Loop).

Figure 4:
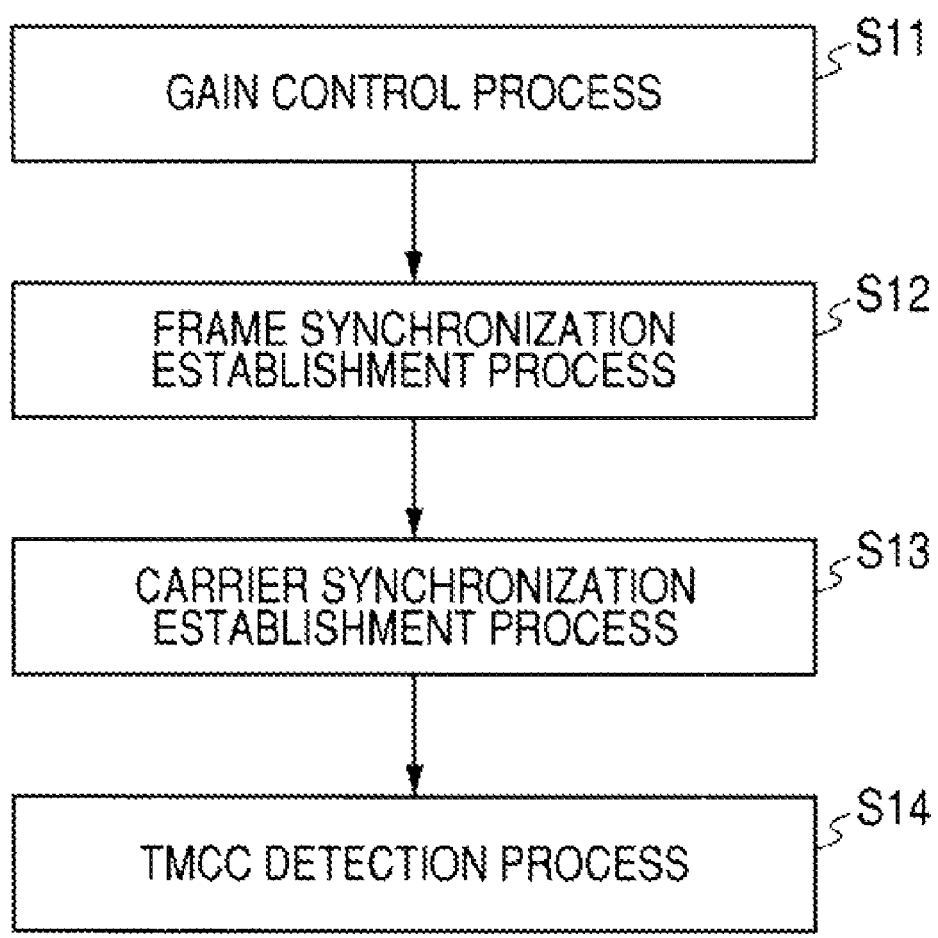
FIG. 4 is a flowchart for illustrating the operation of the reception device.

Next, by referring to the flowchart of FIG. 4, described is the operation of the reception device of FIG. 2.

When broadcast waves of BS digital broadcasting services are received by an antenna, and when a modulation signal turned out to be an IF signal is then supplied to the demodulation section 11, the demodulation section 11 demodulates the modulation signal to derive a demodulation signal including an I component and, a Q component. The resulting demodulation signal is then forwarded to the frame synchronization section 13 and the carrier synchronization section 14 via the A/D conversion section 12.

Upon reception of the demodulation signal, in step S11, the carrier synchronization section 14 starts a gain control process of controlling the gain $g_1$ of the amplifier 51 of the loop filter 36 (FIG. 3). The procedure then goes to step S12.

In step S12, the frame synchronization section 13 starts a frame synchronization establishment process, i.e., establishing frame synchronization by detecting the unique symbols W1, and W2/W3 from the demodulation signal provided thereto, and forwarding, to the carrier synchronization section 14, the known symbol information representing the timings of the known symbols in the demodulation signal, i.e., unique symbols W1, W2, and W3 and the burst symbols. The procedure then goes to step S13.

In step S13, the carrier synchronization section 14 starts the carrier synchronization establishment process described by referring to FIG. 3, i.e., establishing carrier synchronization for the demodulation signal provided thereto. The procedure then goes to step S14.

As such, in step S13, when the carrier synchronization section 14 starts the carrier synchronization establishment process, the carrier synchronization section 14 responsively provides, to the decoding section 15, the demodulation signal in which symbol rotation is corrected.

In the decoding section 15, the demodulation signal from the carrier synchronization section 14 is subjected to Viterbi decoding and Reed-Solomon decoding. The decoding result, i.e., decoding data, is then forwarded to the decoder 16 and the TMCC detection section 17.

In the decoder 16, the coding data as a result of MPEG coding as a main signal in the decoding data from the decoding section 15 is subjected to MPEG decoding. The decoder 16 then outputs content data such as image data and audio data being the result of MPEG decoding.

On the other hand, in the TMCC detection section 17, in step S14, a TMCC detection process is started, i.e., detecting the TMCC being the control information including the modulation technique of the main signal from the decoding data provided by the decoding section 15, and forwarding the TMCC to the carrier synchronization section 14.

Figure 5:
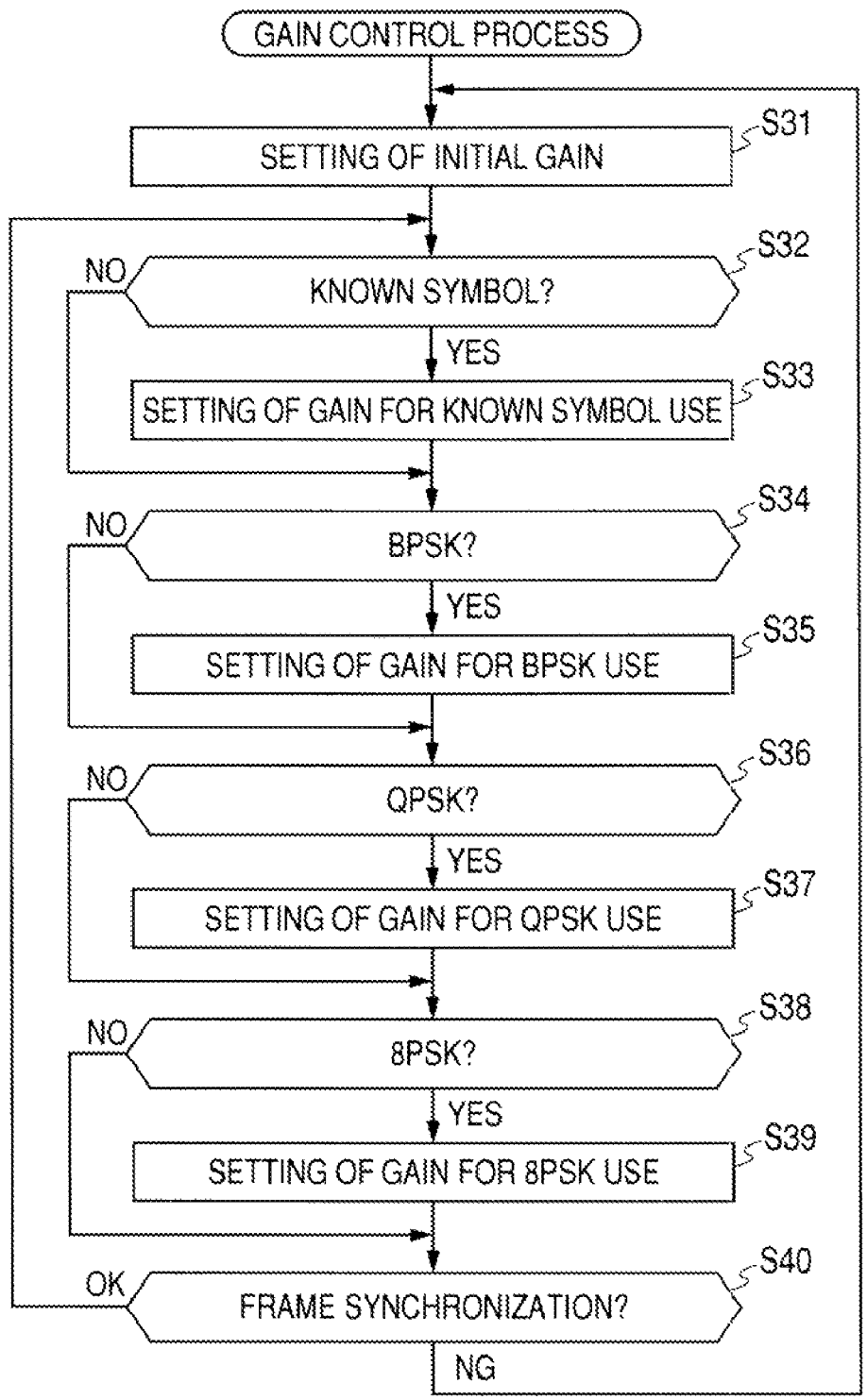
FIG. 5 is a flowchart of a gain control process.

Next, by referring to the flowchart of FIG. 5, described is a gain control process started in the carrier synchronization section 14 (FIG. 3) in step S11 of FIG. 4.

In the gain control process, in step S31, the gain control section 38 of the carrier synchronization section 14 sets the initial gain as the gain $g_1$ of the amplifier 51 of the loop filter 36. The procedure then goes to step S32.

In step S32, based on the known symbol information provided by the frame synchronization section 13 (FIG. 2), the gain control section 38 determines whether it is the timing of forwarding the known symbols, i.e., unique symbols W1, W2, and W3 or burst symbols, from the A/D conversion section 12 to the carrier synchronization section 14.

In step S32, when the determination result tells that it is not the timing of forwarding the known symbols, the procedure skips step 333 and goes to step S34.

Also in step S32, when the determination result tells that it is the timing of forwarding the known symbols, the procedure goes to step S33. In step S33, the gain control section 38 sets the gain for the known symbols as the gain $g_1$ of the amplifier 51 of the loop filter 36, and the procedure goes to step S34.

Herein, in step S12 of FIG. 4, the processes of steps S32 and S33 are skipped until, after the frame synchronization establishment process is started, the supply of the known symbol information is started by the frame synchronization section 13 to the gain control section 38 of the carrier frequency section 14.

In step S34, based on the TMCC provided by the TMCC detection section 17, the gain control section 38 determines whether it is the timing of supplying the symbols of the main signal through with BPSK modulation from the A/D conversion section 12 to the carrier synchronization section 14.

In step S34, when the determination result tells that it is not the timing of supplying the symbols of the main signal through with BPSK modulation, the procedure skips step S35, and goes to step S36.

Also in step S34, when the determination result tells that it is the timing of supplying the symbols of the main signal through with BPSK modulation, the procedure goes to step S35. In step S35, the gain control section 38 of the carrier synchronization section 14 sets the gain for BPSK as the gain $g_1$ of the amplifier 51 of the loop filter 36, and the procedure then goes to step S36.

In step S36, based on the TMCC provided by the TMCC detection section 17, the gain control section 38 determines whether it is the timing of supplying the symbols of the main signal through with QPSK modulation from the A/D conversion section 12 to the carrier synchronization section 14.

In step S36, when the determination result tells that it is not the timing of supplying the symbols of the main signal through with QPSK modulation, the procedure skips step S37, and goes to step S38.

Also in step S36, when the determination result tells that it is the timing of supplying the symbols of the main signal through with QPSK modulation, the procedure goes to step S37. In step S37, the gain control section 38 of the carrier synchronization section 14 sets the gain for QPSK as the gain $g_1$ of the amplifier 51 of the loop filter 36, and the procedure then goes to step S38.

In step S38, based on the TMCC provided by the TMCC detection section 17, the gain control section 38 determines whether it is the timing of supplying the symbols of the main signal through with 8PSK modulation from the A/D conversion section 12 to the carrier synchronization section 14.

In step S38, when the determination result tells that it is not the timing of supplying the symbols of the main signal through with 8PSK modulation, the procedure skips step S39, and goes to step S40.

Also in step S38, when the determination result tells that it is the timing of supplying the symbols of the main signal through with 8PSK modulation, the procedure goes to step S39. In step S39, the gain control section 38 of the carrier synchronization section 14 sets the gain for QPSK as the gain $g_1$ of the amplifier 51 of the loop filter 36, and the procedure then goes to step S40.

Herein, in step S14 of FIG. 4, the processes of steps S34 to S39 are skipped until, after the TMCC detection process is started, the supply of the TMCC is started by the TMCC detection section 17 to the gain control section 38 of the carrier frequency section 14.

In step S40, the gain control section 38 determines whether frame synchronization is being established or not.

In step S40, when the determination result tells that the frame synchronization is being established, i.e., when the frame synchronization section 13 keeps supplying the known symbol information to the gain control section 38, the procedure returns to step S32, and the processes are repeated similarly to the above.

Also in step S40, when the determination result tells that no frame synchronization is being established, i.e., when the frame synchronization section 13 stops supplying the known symbol information to the gain control section 38, the procedure returns to step S31, and the processes are repeated similarly to the above.

As such, for the carrier synchronization establishment process, the modulation technique of a modulation signal is used as a basis to control the gain $g_1$ of the loop filter 36, i.e., for the symbols of a main signal through with BPSK modulation, used as the gain $g_1$ of the loop filter 36 is a BPSK gain considered appropriate therefor, for the symbols of a main signal through with QPSK modulation, used as the gain $g_1$ of the loop filter 36 is a QPSK gain considered appropriate therefor, and for the symbols of a main signal through with 8PSK modulation, used as the gain $g_1$ of the loop filter 36 is a 8PSK gain considered appropriate therefor. As such, with the modulation techniques of BPSK, QPSK, and 8PSK, for example, the reception device can be enhanced more in capability than a case where any one specific gain having nothing to do with those modulation techniques is used as the gain $g_1$ of the loop filter 36, and a case where, for some of the modulation techniques, a gain of predetermined value having nothing to do therewith is used as the gain $g_1$ of the loop filter 36, and for the remaining modulation techniques, a value of 0 also having nothing to do therewith is used as the gain $g_1$ of the loop filter 36.

That is, this enables to increase the range of a frequency deviation of a carrier capable of carrier synchronization, to reduce the time required for carrier synchronization, to reduce the possibility of erroneous carrier synchronization, to reduce the occurrence of cycle slips, and more. As a result, stable reception with a fewer number of bit errors can be achieved.

Figure 6:
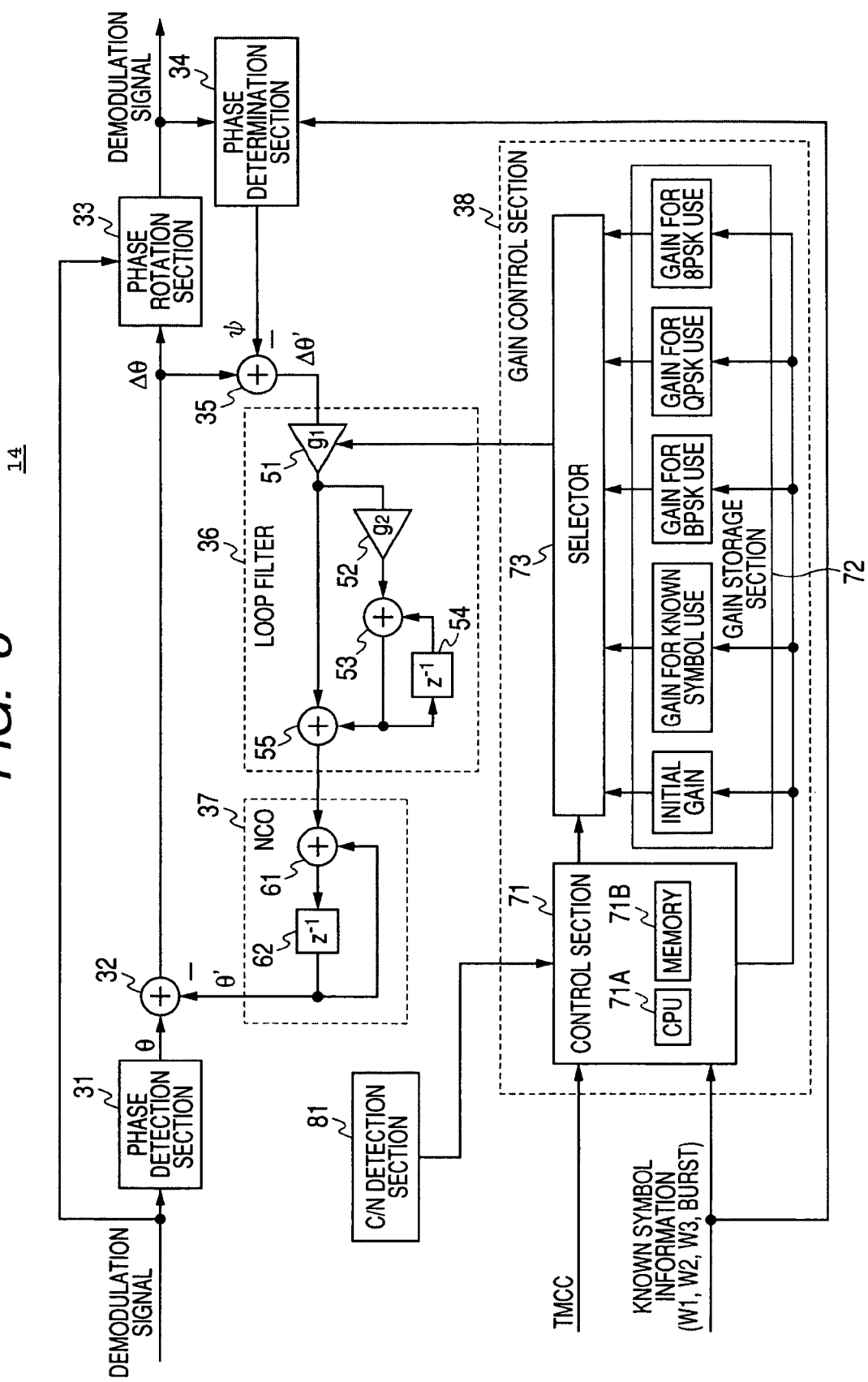
FIG. 6 is a block diagram showing another exemplary configuration of the carrier synchronization section 14.

FIG. 6 shows another exemplary configuration of the carrier synchronization section 14 of FIG. 2.

Note that, in FIG. 6, any components corresponding to those of FIG. 3 are provided with the same reference numerals, and not described twice if allowed.

That is, similarly to the configuration of FIG. 3, the carrier synchronization section 14 of FIG. 6 is configured to include the phase detection section 31, the phase error detection section 32, the phase rotation section 33, the phase determination section 34, the computation section 35, the loop filter 36, the NCO 37, and the gain control section 38. The difference from the configuration of FIG. 3 lies in that a C/N detection section 81 is newly provided.

The C/N detection section 81 estimates a C/N of a modulation signal for detection, and forwards the detection result to the control section 71 of the gain control section 38. Such estimation and detection is made based on the gain of an AGC (Automatic Gain Control) (not shown) provided inside of the demodulation section 11 being a tuner.

Based on the C/N from the C/N detection section 81, the control section 71 adjusts the gains stored in the gain storage section 72, i.e., initial gain, known symbol gain, BPSK gain, QPSK gain, and 8PSK gain.

That is, the control section 71 stores therein a C/N table, including a plurality of C/Ns with a correlation with gains considered appropriate for establishment of carrier synchronization, i.e., initial gain, known symbol gain, BPSK gain, QPSK gain, and 8PSK gain. Using such a C/N table, the storage values in the gain storage section 72 are changed to those whatever corresponding to the C/Ns from the C/N detection section 81, i.e., initial gain, known symbol gain, BPSK gain, QPSK gain, and 8PSK gain.

As such, in the control section 71, the C/Ns provided by the C/N detection section 81 are used as a basis to adjust the gains stored in the gain storage section 72, i.e., initial gain, known symbol gain, BPSK gain, QPSK gain, and 8PSK gain, thereby enabling to control the gain $g_1$ of the amplifier 51 of the loop filter 36 to be appropriate in value to the C/N of a modulation signal on a modulation technique basis.

Figure 7:
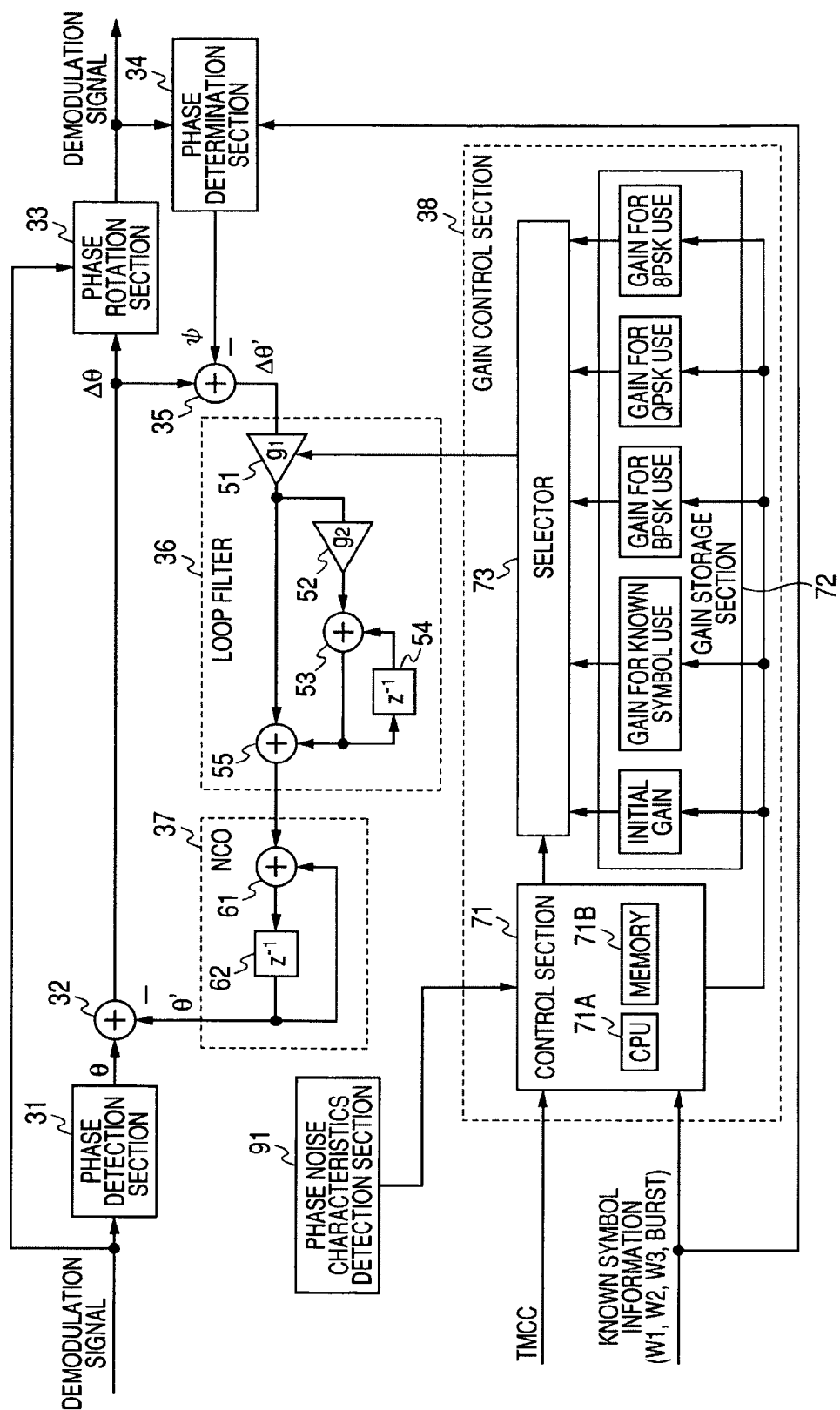
FIG. 7 is a block diagram showing still another exemplary configuration of the carrier synchronization section 14.

FIG. 7 shows still another exemplary configuration of the carrier synchronization section 14 of FIG. 2.

Note that, in FIG. 7, any components corresponding to those of FIG. 3 are provided with the same reference numerals, and not described twice if allowed.

That is, similarly to the configuration of FIG. 3, the carrier synchronization section 14 of FIG. 7 is configured to include the phase detection section 31, the phase error detection section 32, the phase rotation section 33, the phase determination section 34, the computation section 35, the loop filter 36, the NCO 37, and the gain control section 38. The difference from the configuration of FIG. 3 lies in that a phase noise characteristics detection section 91 is newly provided.

The phase noise characteristics detection section 91 estimates a bit error ratio from the frequency of error correction in a short time in the decoding section 15 (FIG. 2) using Viterbi decoding or Reed-Solomon decoding. From the resulting bit error ratio, the phase noise characteristics are estimated and detected for a modulation signal for supply to the control section 71 of the gain control section 38.

Based on the phase noise characteristics provided by the phase noise characteristics detection section 91, the control section 71 adjusts the gains stored in the gain storage section 72, i.e., initial gain, known symbol gain, BPSK gain, QPSk gain, and 8PSK gain.

That is, the control section 71 stores therein a phase noise characteristics table, including a plurality of phase noise characteristics with a correlation with gains considered appropriate for establishment of carrier synchronization, i.e., initial gain, known symbol gain, BPSK gain, QPSK gain, and 8PSK gain. Using such a phase noise characteristics table, the storage values in the gain storage section 72 are changed to those whatever corresponding to the phase noise characteristics from the phase noise characteristics detection section 91, i.e., initial gain, known symbol gain, BPSK gain, QPSK gain, and 8PSK gain.

As such, in the control section 71, the phase noise characteristics from the phase noise characteristics detection section 91 are used as a basis to adjust the gains stored in the gain storage section 72, i.e., initial gain, known symbol gain, BPSK gain, QPSK gain, and 8PSK gain, thereby enabling to control the gain $g_1$ of the amplifier 51 of the loop filter 36 to be appropriate in value to the phase noise characteristics of a modulation signal on a modulation technique basis.

Alternatively, the carrier synchronization section 14 may be provided with both the C/N detection section 81 of FIG. 6 and the phase noise characteristics detection section 91 of FIG. 7. With this being the configuration, based on both the C/N and the phase noise characteristics, the control section 71 becomes able to adjust the gains stored in the gain storage section 72, i.e., initial gain, known symbol gain, BPSK gain, QPSK gain, and 8PSK gain.

In this case, the gain $g_1$ of the amplifier 51 of the loop filter 36 can be controlled to take a value appropriate for both the C/N and the phase noise characteristics.

Note that the invention is applicable not only to a reception device for receiving a modulation signal of BS broadcasting but also to a reception device for receiving a modulation signal being a result of digital modulation of a carrier in CS (Communication Satellite) broadcasting or others.

Other than being installed into the memory 71B in advance, the program to be run by the CPU 71A of the control section 71 may be installed from a removable recording medium such as flexible disk, CD-ROM (Compact Disc Read Only Memory), MO (Magneto Optical) disk, DVD (Digital Versatile Disc), magnetic disk, and semiconductor memory.

Alternatively, the program may be installed through downloading from a download site wirelessly or over a cable network.

In this specification, the steps of describing a program for making a computer to go through various types of processes are not executed necessarily in a time series in order as described in the flowchart, and the steps include any process to be executed in parallel or separately, e.g., any parallel process or any process by objects.

It should be understood by those skilled in the art that various modifications, combinations, sub-combinations and alterations may occur depending on design requirements and other factors insofar as they are within the scope of the appended claims or the equivalents thereof.

What is claimed is:

1. A reception device that receives a modulation signal being a result of digital modulation of a carrier, the device comprising:
   a demodulation section that demodulates the modulation signal into a demodulation signal including an I component of the same phase as that of the carrier and a Q component orthogonal to the carrier;
   a numerically controlled oscillation section that generates a signal of predetermined phase;
   a phase error detection section that detects a first phase error between a phase of a symbol of the demodulation signal and the predetermined phase of the signal generated by the numerically controlled oscillation section;
   a phase rotation section that rotates the phase of the symbol of the demodulation signal in accordance with the phase error;
   a loop filter that filters a second phase error, and in accordance with a filtering result, controls the numerically controlled oscillation section;
   a gain storage section that stores therein a plurality of gains for an corresponding plurality of modulation techniques, at least one of the plurality of modulation techniques being used when generating the modulation signal, the stored gains being variable; and
   a gain control section that controls a gain of the loop filter based on at least one of the plurality of gains stored in the gain storage section.

2. The reception device according to claim 1, further comprising
   a control information detection section that detects, from the demodulation signal, control information including a modulation technique of the modulation signal.

3. The reception device according to claim 1, further comprising
   a C/N (Carrier to Noise Ratio) detection section that detects a C/N of the modulation signal, wherein
   the gain control section adjusts the gains and stores the adjusted gains in the gain storage section based on the C/N.

4. The reception device according to claim 1, further comprising
   a phase noise characteristics detection section that detects phase noise characteristics of the modulation signal, wherein
   the gain control section adjusts the gains and stores the adjusted gains in the gain storage section based on the phase noise characteristics.

5. A control method of controlling a reception device that receives a modulation signal being a result of digital modulation of a carrier,
   the reception device including:
   a demodulation section that demodulates the modulation signal into a demodulation signal including an I component of the same phase as that of the carrier and a Q component orthogonal to the carrier,
   a numerically controlled oscillation section that generates a signal of predetermined phase,
   a phase error detection section that detects a first phase error between a phase of a symbol of the demodulation signal and the predetermined phase of the signal generated by the numerically controlled oscillation section,
   a phase rotation section that rotates the phase of the symbol of the demodulation signal in accordance with the phase error,
   a loop filter that filters a second phase error, and in accordance with a filtering result, controls the numerically controlled oscillation section, and
   a gain storage section that stores therein a plurality of gains for an corresponding plurality of modulation techniques, at least one of the plurality of modulation techniques being used when generating the modulation signal, the stored gains being variable,
   the control method comprising the step of:
   controlling a gain of the loop filter based on at least one of the plurality of gains stored in the gain storage section.

6. A non-transitory computer-readable recording media tangibly storing a program, the program allowing a computer to execute a control process of controlling a reception device that receives a modulation signal being a result of digital modulation of a carrier, the reception device including: a demodulation section that demodulates the modulation signal into a demodulation signal including an I component of the same phase as that of the carrier and a Q component orthogonal to the carrier, a numerically controlled oscillation section that generates a signal of predetermined phase, a phase error detection section that detects a first phase error between a phase of a symbol of the demodulation signal and the predetermined phase of the signal generated by the numerically controlled oscillation section, a phase rotation section that rotates the phase of the symbol of the demodulation signal in accordance with the phase error, a loop filter that filters a second phase error, and in accordance with a filtering result, controls the numerically controlled oscillation section, and a gain storage section that stores therein a plurality of gains for an corresponding plurality of modulation techniques, at least one of the plurality of modulation techniques being used when generating the modulation signal, the stored gains being variable, the control process comprising the step of: controlling a gain of the loop filter based on at least one of the plurality of gains stored in the gain storage section.

* * * * *